Sept. 10, 1929.  E. A. FISHER ET AL  1,727,429
MANUFACTURE OF FLOUR
Filed May 25, 1928
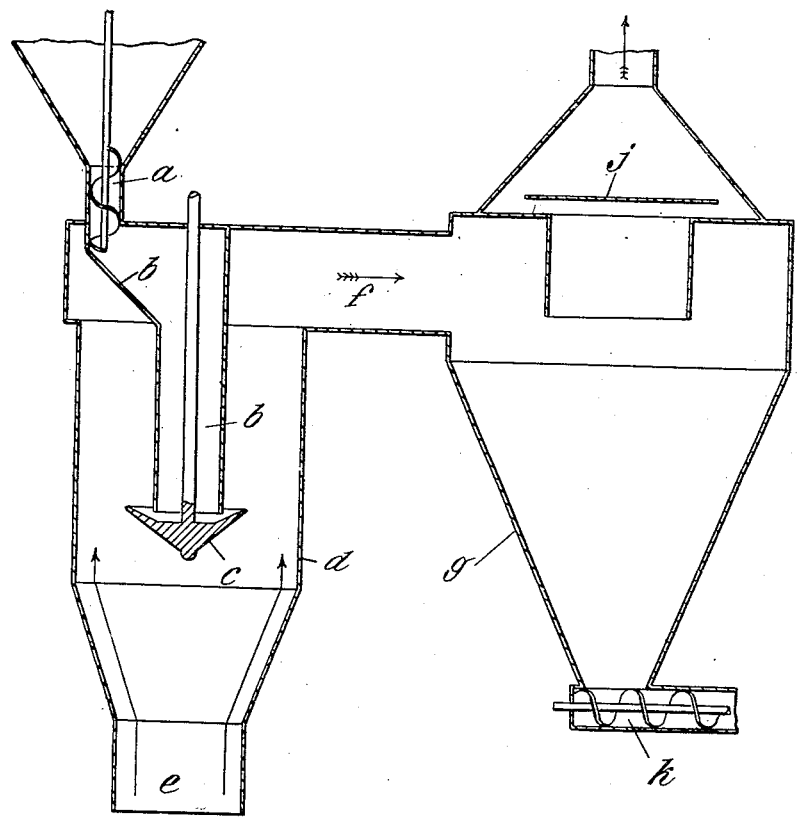
Inventor
Ernest Arthur Fisher and
Charles Robert Jones
By
Att'y Patented Sept. 10, 1929.

1,727,429

UNITED STATES PATENT OFFICE.

ERNEST ARTHUR FISHER AND CHARLES ROBERT JONES, OF ST. ALBANS, ENGLAND.

MANUFACTURE OF FLOUR.

Application filed May 25, 1928, Serial No. 280,579, and in Great Britain March 27, 1928.

This invention relates to the heat treatment of flour for the purpose of improving the baking qualities thereof, and has for its object to provide an improved process and means therefor, whereby the flour may economically be treated with expedition and certainty.

It has previously been proposed to subject flour to heat treatment under non-oxidizing conditions, e. g. in the presence of steam or moist air or in a substantially closed vessel, and it has also been proposed to heat dry or damp wheat out of contact with air currents but under conditions which permit free escape of moisture evaporated therefrom.

In our co-pending British application No. 15,542/27 is described a process for improving the baking quality of flour, according to which thin layers of flour are subjected to heat treatment in a current of air of such temperature and humidity, as will raise the flour to and maintain it at a temperature of within the approximate limits of 130° and 180° F. without substantial loss of moisture.

In the process according to the present invention, the flour in cloud form is subjected to treatment by a current of air which is at such temperature and humidity as will raise the temperature of the flour to within the approximate limits of 130° and 180° F. without substantial loss of moisture.

This method, which has the advantage of reducing the time required for the treatment, besides being automatic, and continuous in action, will be described, by way of example, with reference to the accompanying drawing which is a diagrammatic sectional elevation of an apparatus which may be used.

As shown in the drawing flour is passed from a conveyor $a$ (of such a type that it is capable of delivering a regular feed at a known rate) down a chute $b$ on to a disc $c$ which rotates rapidly below the lower end of the chute $b$ in a chamber $d$ so that the flour is broken up and flung centrifugally into a thin cloud. A stream of heated and humidified air entering at the lower end $e$ of the chamber $d$ is driven upwards past the disc $c$ at such a velocity as to carry the flour with it. The air and flour pass from the chamber $d$, through the duct $f$, into an expansion chamber $g$ similar to a cyclone dust collector where the flour is deposited. The air then passes out of the cyclone $g$ through textile fabric or over a series of baffle plates $j$ where the finest flour particles not precipitated previously will be deposited, and the air may then be re-circulated through the plant via heaters and sprays and controls. The flour from the cyclone $g$ is carried by a conveyor $k$ to a heat-insulated box or small bin (not shown) where it may remain for a short time if desired.

The time required for maximum improvement is quite short and appears to depend on several factors which include moisture content of, and temperature reached by, the flour. In controlling the operation, it appears to be important that the humidity of the air leaving the cyclone, where the flour has been deposited, should be high—preferably over 90% relative humidity—a condition which can be assured by attention to such factors as rate of feed of flour, temperature, humidity and velocity of entering air. In this way not only does little or no loss of moisture from the flour occur during treatment, but the extent of the improvement may be increased or the time in which it is effected shortened.

As an illustration, in the case of one low grade flour from the tail of the mill (representing about 15% of the total flour stream) the temperature of the air leaving the cyclone was 145° F. and its relative humidity 90%. One passage through the plant and 10 minutes lying in the bin produced substantial improvement in the quality of the flour. The temperature reached by the flour was roughly 140° F. and its moisture content (14 to 14½%) was substantially unchanged by the treatment.

After treatment the flour may be led away from the bin through a conveyor ($a$) into a second machine where the flour may be cooled by blowing humidified air through it in the same manner, or ($b$) into a chamber where it may be both cooled and moistened by spraying with cold air and finely atomized water as in the Humphries process; or ($c$) the flour may be cooled in any other convenient manner.

This treatment can be applied not only to finished flour but to those intermediate types of milling stock, such as semolina middlings and dunst, from which most of the germ and bran have been removed, and to any or all of the various "divides" from which the final flour is made by mixing. This point is important as not all parts of the same flour stream may require treatment; and by dividing the feed in an appropriate manner any divide or group of divides may be treated as desired.

The improvements in flour due to this treatment are:—

(1) An increase in dough stability.
(2) Increased water absorption by dough.
(3) Larger loaf.
(4) Better shaped loaf—other than tinned.
(5) Frequently a better loaf colour (crumb); this is not a bleaching action as the colour of the extracted oil does not appear to be effected.

These improvements are essentially those brought about by the addition of chemical improvers to flour. Not all flours however, can be improved either by chemical improvers or by heat treatment. "Weaker" flours can, however, be made "stronger" by such treatment and to a marked extent.

An important advantage of the process is that it may be used for the purpose of sterilizing flour in the sense of destroying acarids or mites, (*Aleurobius farinæ*). The process may be carried out with this as the primary object and/or with a view to improving the flour.

Thus a sample of badly mite-infested flour, treated in the same manner as the low-grade flour in the illustration quoted above, was found to be free from living mites immediately after treatment and none were found to develop during subsequent storage, showing that the flour had been sterilized efficiently, i. e., that the eggs and larvæ had been destroyed as well as the adult pests.

We claim:—

1. A process for improving the baking quality of flour, wherein the flour in cloud form is subjected to treatment by a strong current of air which is at such temperature and humidity as will raise the temperature of the flour to within the approximate limits of 130° and 180° F. without substantial loss of moisture, substantially as set forth.

2. A process as claimed in claim 1 in which the relative humidity of the air current exceeds 90%.

ERNEST ARTHUR FISHER.
CHARLES ROBERT JONES.